May 12, 1931.     H. R. LORANGER ET AL     1,804,836
SCRUBBER FOR REFRIGERATING APPARATUS
Filed June 16, 1924

Inventors
Hubert R. Loranger
Ubald R. Loranger

By Whittemore Hulbert Whittemore
   Belknap         Attorneys

Patented May 12, 1931

1,804,836

UNITED STATES PATENT OFFICE

HUBERT R. LORANGER, OF HIGHLAND PARK, AND UBALD R. LORANGER, OF DETROIT, MICHIGAN; MARIE F. LORANGER EXECUTRIX OF SAID UBALD R. LORANGER, DECEASED; ASSIGNORS TO AUTOMATIC FREEZER CORPORATION, OF DETROIT, MICHIGAN, A CORPORATION OF MICHIGAN

SCRUBBER FOR REFRIGERATING APPARATUS

Application filed June 16, 1924. Serial No. 720,446.

The invention relates to refrigerating systems of the type in which a suitable medium, such as sulphur dioxide, is first liquefied by compression and cooling and then circulated through a coil in a brine tank where it is expanded to produce the refrigerating effect.

In the copending application of Allen C. Thayer, Serial Number 615,672, filed January 29, 1923, an apparatus is described for removing corrosive substances which are formed during the circulation of the sulphur dioxide and our invention constitutes an improvement upon the apparatus described therein. We have found that it is advantageous to locate the scrubber for removing the corrosive impurities in a position in the system where the sulphur dioxide is in the liquid state and we have, therefore, provided a construction which is adapted for this purpose.

One of the objects of the invention is to provide an apparatus which will function as a combined scrubber, strainer and a reservoir for the liquid sulphur dioxide. Another object is to provide a scrubber in which the active material is retained within a screen having a large surface area. Other objects will be apparent from the detail description of the apparatus which will be given hereinafter.

In the drawings:—

In the past considerable difficulty has been experienced with refrigerating systems in which sulphur dioxide is employed as the refrigerating medium. In practice air and moisture finds its way into the system and combines with the sulphur dioxide to form sulphurous and sulphuric acid which in turn corrodes the metal parts of the system with which said refrigerant comes in contact. The corrosive substances so formed react with the metallic parts of the compressor and form substances which may be carried by the refrigerating medium through the system, hence deposits are formed around the working parts which seriously interfere with their action.

A is a cylindrical container provided at the opposite ends with the plugs B and B', the former being provided with an inlet nipple C located centrally thereof and the latter being provided with the outlet nipple C' preferably offset from the center. Within the container A are located screens D preferably slightly spaced from the ends of the plugs B and B' and between the screens there is a conical shell E also formed of screening in which is placed the active material for reacting with the acid impurities in the sulphur dioxide. One hundred mesh screening is a suitable material to be used for the shell and zinc or iron chips or turnings F are placed therein as this material has been found to chemically react with the acid impurities in the sulphur dioxide. Surrounding the conical shell E we preferably place asbestos which forms a filter for the liquid and prevents any solid particles formed from the action of the acid upon the metal parts of the system from passing through the outlet C'.

Figure 1:
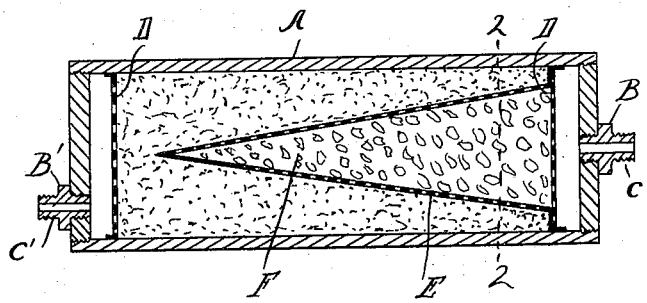
Figure 1 is a longitudinal section through the scrubber.
Figure 2:
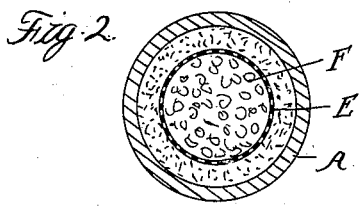
Figure 2 is an end view thereof.
Figure 3:
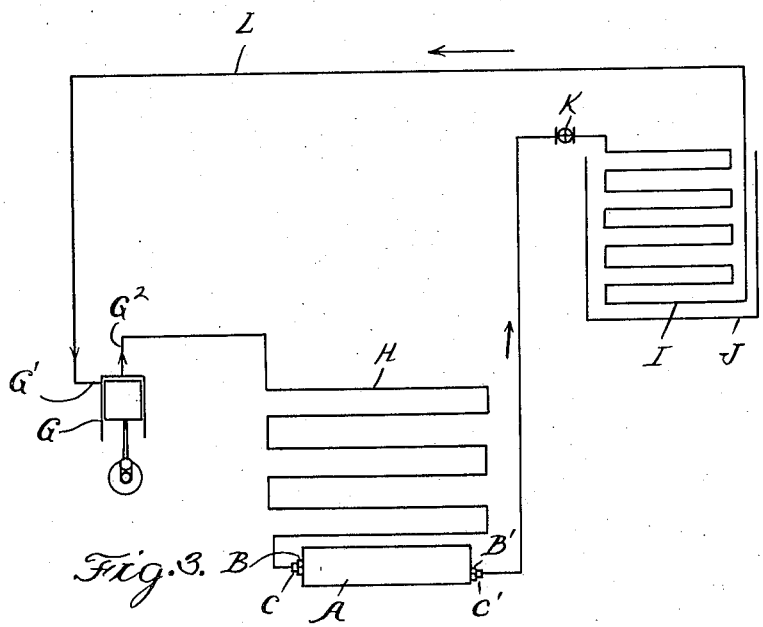
Figure 3 is a diagrammatic view showing the location of the scrubber in a refrigerating system.

A diagrammatic illustration of a refrigerating system is shown in Figure 3 in which G represents a compressor having valve controlled inlet and outlet connections G' and $G^2$ respectively. The medium which is compressed in the compressor G passes through the cooling coils H and at the lowermost portion of the coils is placed the scrubber container A arranged in a horizontal position. The outlet C' of the scrubber is connected to the coils I in a brine tank J by passing through the relief valve K. The expanded medium is then carried to the inlet G' of the compressor through the pipe L.

In the operation of the system, the sulphur dioxide is liquefied in the coils H and in the liquid state passes through the scrubber where the impurities are removed and the purified liquid is then carried through the expansion valve to the coils I where it absorbs heat from the brine solution and again becomes gaseous and returns to the compressor.

The diameter of the container A is preferably greater than that of the pipes forming the coils H and by placing the scrubber below the coils it forms a reservoir for collecting the liquefied sulphur dioxide formed in the coils. It will be apparent, therefore, that the scrubber performs a triple function; that is it removes the acid formed from the refrigerating medium; it constitutes a filter so as to remove from the refrigerating medium the solid particles formed from the action of the acid upon the metal parts of the system and it also acts as a reservoir for the liquid condensed in the cooling coils.

What we claim as our invention is:—

1. The combination with a refrigerating system using a medium adapted to be liquefied and having acid forming properties, of a scrubber located in a position in said system where said medium is in the liquid state, said scrubber containing a substance for removing acid impurities carried by said medium.

2. The combination with a refrigerating system using sulphur dioxide having acid forming properties as a refrigerating medium, of a scrubber located in a position in said system where the sulphur dioxide is in the liquid state, said scrubber containing a material for removing acid impurities carried by said sulphur dioxide, said scrubber also having means associated with the material aforesaid for removing from the sulphur dioxide any corrosive substances that may be created by the action of the acid on the metal parts of the system.

3. In a refrigerating system, the combination with a compressor and cooling coils for liquefying the refrigerating medium, of a container connected to said coils to form a reservoir for the liquefied medium, said container being provided with inlet and outlet connections, and means for retaining an active material therebetween for removing a corrosive substance carried by said liquefied medium.

4. In a refrigerating system using as the refrigerating medium sulphur dioxide having acid-forming properties, the combination with a pump for compressing the sulphur dioxide and a condensing coil for receiving the compressed sulphur dioxide, of a scrubber at the lower end of said condensing coil comprising a container constituting a reservoir for the condensed sulphur dioxide received from said condensing coil, said container having therein a material for chemically reacting with the acid impurities formed from the sulphur dioxide, and means in said container for removing from the sulphur dioxide the products of said chemical reaction.

5. The combination with a refrigerating system employing a refrigerating medium adapted to be liquefied and having means for maintaining said medium in the liquid state in a certain portion of the system, of a scrubber located in a portion of the system where said medium is liquid, said scrubber containing a substance for removing a corrosive impurity associated with said medium.

6. The combination with a refrigerating system having a closed circuit and employing a refrigerating medium, said system having means for maintaining said medium liquid in one portion thereof and gaseous in other portions, of a scrubber located in said closed circuit at a point where said medium is liquid, and means in said scrubber for chemically reacting with a corrosive impurity associated with said medium.

7. The combination with a refrigerating system having a closed circuit and employing sulphur dioxide as a refrigerating medium, said system having means for maintaining the sulphur dioxide liquid in one portion and gaseous in other portions, of a scrubber arranged in said closed circuit in a portion where all of the sulphur dioxide passes therethrough while in a liquid state, and means in the scrubber for removing corrosive acid substances associated with the sulphur dioxide.

In testimony whereof we affix our signatures.

HUBERT R. LORANGER.
UBALD R. LORANGER.